United States Patent
Kim

(10) Patent No.: US 10,547,265 B2
(45) Date of Patent: Jan. 28, 2020

(54) SYSTEM AND METHOD FOR CONTROLLING MOTOR

(71) Applicant: HYUNDAI MOBIS CO., LTD., Seoul (KR)

(72) Inventor: Sang Min Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 144 days.

(21) Appl. No.: 15/887,594

(22) Filed: Feb. 2, 2018

(65) Prior Publication Data

US 2018/0342970 A1    Nov. 29, 2018

(30) Foreign Application Priority Data

May 25, 2017   (KR) .................. 10-2017-0064727

(51) Int. Cl.

| H02P 23/14 | (2006.01) |
|---|---|
| H02P 23/00 | (2016.01) |
| H02P 27/08 | (2006.01) |
| H02P 23/10 | (2006.01) |

(52) U.S. Cl.
CPC .......... H02P 23/14 (2013.01); H02P 23/0004 (2013.01); H02P 23/10 (2013.01); *H02P 27/08* (2013.01)

(58) Field of Classification Search
CPC ....... H02P 23/0004; H02P 23/10; H02P 23/14
See application file for complete search history.

(56) References Cited

U.S. PATENT DOCUMENTS

| 7,173,393 B2 * | 2/2007 | Maeda .............. H02M 7/53873 318/400.02 |
|---|---|---|
| 2004/0071000 A1 * | 4/2004 | Escobar ................... H02J 3/01 363/63 |
| 2016/0282392 A1 * | 9/2016 | Lee ......................... H02P 21/36 |

* cited by examiner

*Primary Examiner* — Jorge L Carrasquillo
(74) *Attorney, Agent, or Firm* — Knobbe Martens Olson & Bear LLP

(57) ABSTRACT

Provided is a motor control system. The motor control system include an inverter connected to a DC link, including both ends which a DC link voltage value is applied across, and including switch groups connected in parallel and applying a three-phase current to a motor according to a switching operation, based on PWM control, of each of the switch groups, a current converter converting voltage values, applied across both ends of shunt resistors included in the switch groups, into DC current values according to an ADC gain, an adder estimating a current value, obtained by summating the DC current values, as a DC link current value, and a PI control unit outputting a voltage value for controlling a field current of the motor to the motor by using the estimated DC link current value according to a PI control method, for controlling a generated power of the DC link.

7 Claims, 5 Drawing Sheets

SYSTEM AND METHOD FOR CONTROLLING MOTOR

CROSS-REFERENCE TO RELATED APPLICATIONS

This application claims priority under 35 U.S.C. § 119 to Korean Patent Application No. 10-2017-0064727, filed on May 25, 2017, the disclosure of which is incorporated herein by reference in its entirety.

TECHNICAL FIELD

The present invention relates to a motor control system and method, and more particularly, to a motor control system and method which estimate a direct current (DC) link current and control a motor by using the estimated DC link current.

BACKGROUND

Generally, in a motor driving system based on a digital pulse width modulation (PWM) alternating current (AC) inverter, feedback of a high-quality motor phase current is needed for performing closed loop current control.

In order to decrease the system cost and simplify a current sensing system, a lot of motor phase current information may be reconstructed based on DC link current information.

The DC link current information may be obtained by a DC link current sensor included in the motor driving system. The DC link current sensor measures an input/output (I/O) current of an inverter included in the motor driving system.

As described above, in order to obtain the DC link current information, a related art motor driving system needs an additional design of the DC link current sensor. However, the additional design of the DC link current sensor causes the increase in total cost of a system.

SUMMARY

Accordingly, the present invention provides a motor control system and method which estimate a DC link current even without using a DC link current sensor.

The present invention also provides a motor control system and method which control a generated power (or a generated current) of a motor by using an estimated DC link current.

In one general aspect, a motor control system includes: an inverter connected to a direct current (DC) link including both ends which a DC link voltage value is applied across, the inverter including a plurality of switch groups connected to one another in parallel and applying a three-phase current to a motor according to a switching operation, based on pulse width modulation (PWM) control, of each of the plurality of switch groups; a current converter respectively converting voltage values, respectively applied across both ends of shunt resistors respectively included in the plurality of switch groups, into DC current values according to an analog-digital converter (ADC) gain; an adder estimating a current value, obtained by summating the DC current values, as a DC link current value; and a proportional integral (PI) control unit outputting a voltage value for controlling a field current of the motor to the motor by using the estimated DC link current value according to a PI control method, for controlling a generated power of the DC link.

In another general aspect, a motor control method includes: respectively converting voltage values, respectively applied across both ends of shunt resistors designed in an inverter for controlling driving a motor, into direct current (DC) current values according to an analog-digital converter (ADC) gain; estimating a current value, obtained by summating the DC current values, as a DC link current value; and outputting a voltage value for controlling a field current of the motor to the motor by using the estimated DC link current value according to a PI control method, for controlling a generated power of a DC link.

Other features and aspects will be apparent from the following detailed description, the drawings, and the claims.

DETAILED DESCRIPTION OF EMBODIMENTS

Figure 1:
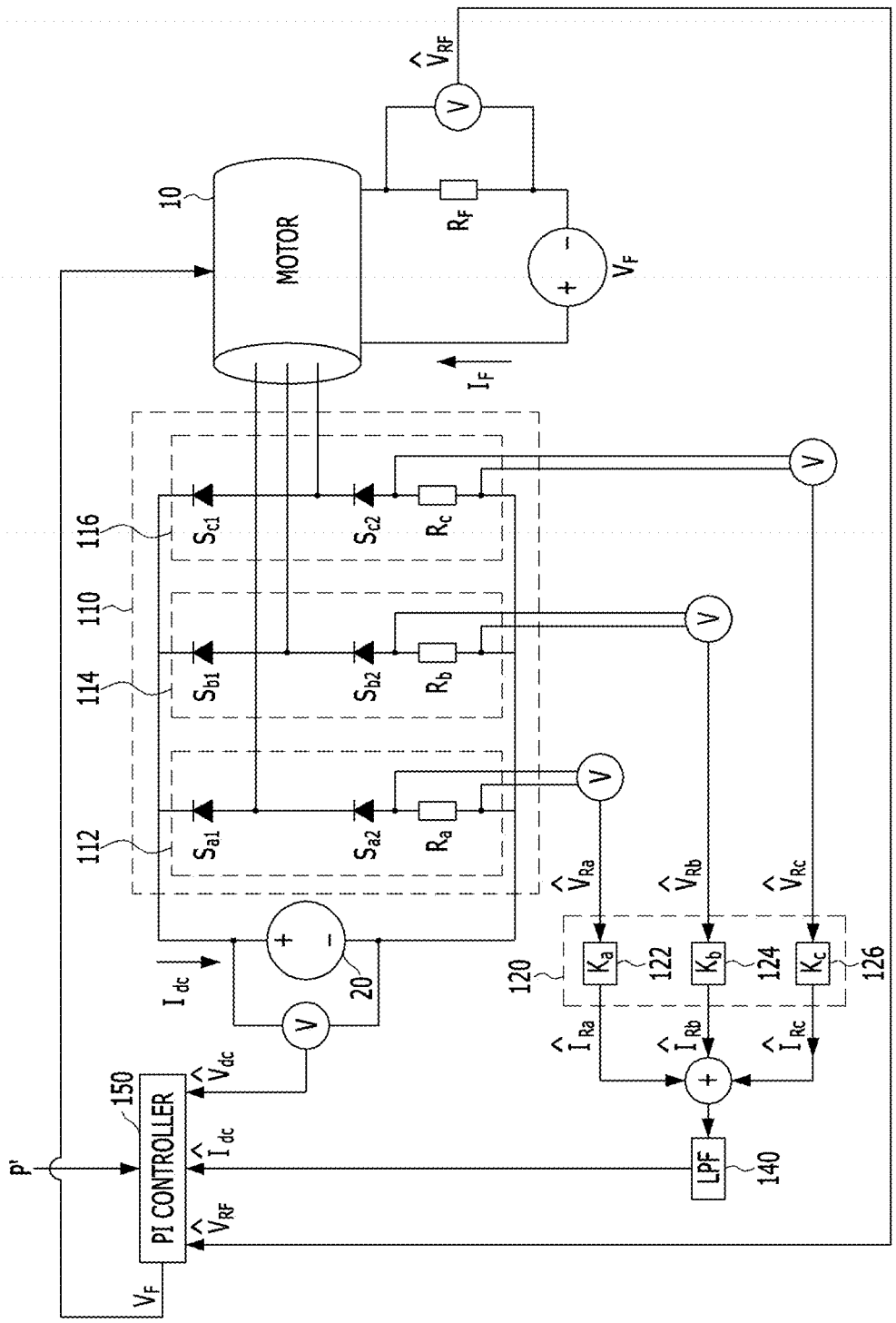
FIG. 1 is a diagram illustrating a configuration of a motor control system according to an embodiment of the present invention.

Hereinafter, embodiments of the present invention will be described in detail with reference to the accompanying drawings. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

FIG. 1 is a diagram illustrating a configuration of a motor control system according to an embodiment of the present invention.

Referring to FIG. 1, the motor control system according to an embodiment of the present invention may be applied to a system for controlling all kinds of motors controlled based on DC link current information. For example, the motor control system may be applied to a system for controlling an integrated starter and generator (ISG) motor or a field winding motor capable of operating in a generating mode in vehicles.

The motor control system for controlling driving of various motors, according to an embodiment of the present invention, may be configured to estimate a DC link current by using a measurement value measured from a shunt resistor which is relatively inexpensive, instead of a conventional DC link current sensor.

Moreover, the motor control system according to an embodiment of the present invention may control a field current of a motor 10 by using the estimated DC link current to control a generated power (or a generated current).

To this end, the motor control system may include an inverter 110 that controls driving of the motor 110, a current converter 120 that respectively converts voltage values, applied across both ends of shunt resistors $R_a$, $R_b$, and $R_c$, included in the inverter 110, into current values, an adder 130 that summates the current values to estimate a summated current value (hereinafter referred to as a DC input current value $\hat{I}_{dc}$) as a DC link current, a filter (or a low pass filter (LPF)) 140 that filters the DC input current value $\hat{I}_{dc}$ estimated as the DC link current, and a proportional integral (PI) control unit 150 that outputs a voltage value $V_F$ for controlling the field current of the motor 10, based on the filtered DC input current value.

A converter (not shown) may be provided in a front end of the inverter 110, and a DC link voltage $\hat{V}_{dc}$ 20 applied across both ends of a device such as a DC link capacitor may be generated between the converter and the inverter 110. The DC link voltage $\hat{V}_{dc}$ 20 may be applied to the inverter 110.

In response to the applied DC link voltage 20, the inverter 110 may apply a three-phase current to the motor 10 by using a pulse width modulation (PWM) control method.

In order to apply the three-phase current to the motor 10, the inverter 110 may include a plurality of switch circuits connected to the DC link voltage 20 in parallel.

The plurality of switch circuits may include first to third switch circuits 112, 114, and 116. Each of the first to third switch circuits 112, 114, and 116 may include a shun resistor (or a shunt current sensor).

In an embodiment of the present invention, it should be notes that a measurement value measured from the shunt resistor included in each of the first to third switch circuits 112, 114, and 116 is used as information for estimating the DC link current.

In detail, the first switch circuit 112 may include an upper switch $S_{a1}$, a lower switch $S_{a2}$, and a shunt resistor $R_a$ which are serially connected to each other. The second switch circuit 114 may also include an upper switch $S_{b1}$, a lower switch $S_{b2}$, and a shunt resistor $R_b$ which are serially connected to each other. Similarly, the third switch circuit 116 may include an upper switch $S_{c1}$, a lower switch $S_{c2}$, and a shunt resistor $R_c$ which are serially connected to each other.

The switches included in each of the first to third switch circuits 112, 114, and 116 may include a power switch and a diode connected to each other in parallel.

In the drawing, reference numeral which refers to the power switch is omitted, but this is for indicating that the power switch connected to the diode is in a turn-off state. This may denote that estimation of the DC link current is performed in a state where all power switches (not shown) are turned off. For this reason, it can be considered that each of the first to third switch circuits 112, 114, and 116 is configured with a plurality of diodes serially connected to each other.

The power switches (not shown) may perform an on/off operation according to a PWM control signal, for generating the three-phase current.

The current converter 120 may convert voltage values $\hat{V}_{R_a}$, $\hat{V}_{R_b}$, and $\hat{V}_{R_c}$, respectively applied across both ends of the shunt resistors $R_a$, $R_b$, and $R_c$ respectively included in the first to third switch circuits 112, 114, and 116, into DC input current values $\hat{I}_{R_a}$, $\hat{I}_{R_b}$, and $\hat{I}_{R_c}$. For example, the current converter 120 may convert a first voltage value $\hat{V}_{R_a}$ applied across both ends of a first shunt resistor $R_a$ into a first DC input current value $\hat{I}_{R_a}$ according to a predesigned first analog-digital converter (ADC) gain $K_a$, convert a second voltage value $\hat{V}_{R_b}$ applied across both ends of a second shunt resistor $R_b$ into a second DC input current value $\hat{I}_{R_b}$ according to a predesigned second ADC gain $K_b$, and convert a third voltage value $\hat{V}_{R_c}$ applied across both ends of a third shunt resistor $R_c$, into a third DC input current value $\hat{I}_{R_c}$ according to a predesigned third ADC gain $K_c$.

The adder 130 may output the DC input current value $\hat{I}_{dc}$ by summating the DC input current values $\hat{I}_{R_a}$, $\hat{I}_{R_b}$, and $\hat{I}_{R_c}$ input from the current converter 120. Here, in an embodiment of the present invention, the DC input current value $\hat{I}_{dc}$ obtained through the summation by the adder 130 may be estimated as the DC link current.

The filter 140 may filter the DC input current value $\hat{I}_{dc}$ applied from the adder 130 by using a low pass filtering method to output the filtered DC input current value $\hat{I}_{dc}$ to the PI control unit 150.

The DC input current value $\hat{I}_{dc}$ obtained through the summation by the adder 130 may be expressed as the following Equation (1):

$$\hat{I}_{dc} = \frac{\omega}{s+\omega}\left(K_a \hat{V}_{R_a} + K_b \hat{V}_{R_b} + K_c \hat{V}_{R_c}\right) \qquad (1)$$

The PI control unit 150 may estimate the DC link current from the DC input current value $\hat{I}_{dc}$, input from the filter 140, a voltage $\hat{V}_{RF}$ applied across both ends of a field shunt resistor RF and input a field circuit of the motor 10, and the DC link voltage $\hat{V}_{dc}$ by using a PI control method and may output the voltage value $V_F$ for controlling the field current of the motor 10, based on the estimated DC link current. The voltage value $V_F$ output from the PI control unit 150 may be applied to the field circuit of the motor 10 so that the generated power (or the generated current) is controlled by controlling the field current of the motor 10.

Figure 2:
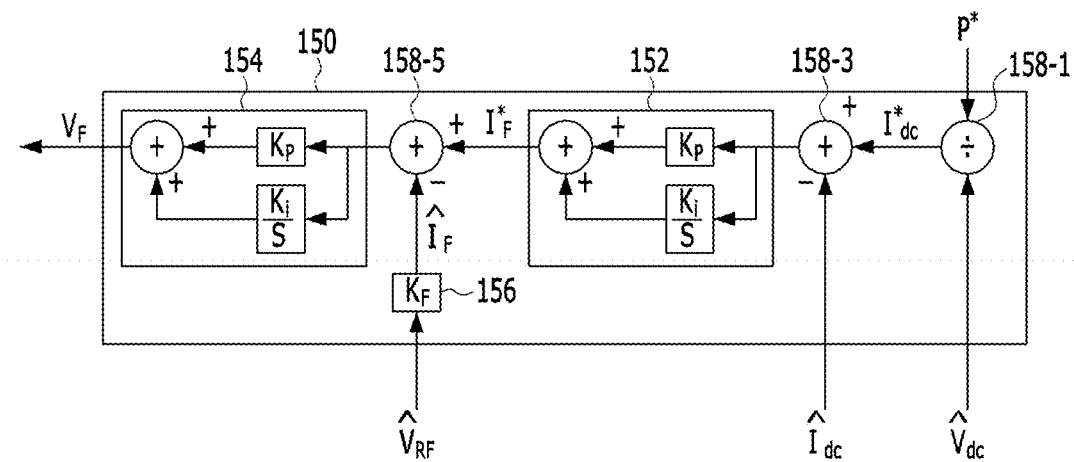
FIG. 2 is a diagram illustrating a configuration of a proportional integral (PI) control unit illustrated in FIG. 1.

FIG. 2 is a diagram illustrating a configuration of the PI control unit 150 illustrated in FIG. 1.

Referring to FIG. 2, the PI control unit 150 may further include a first PI controller 152, a second PI controller 154, and a current converter 156, for controlling the field current of the motor 10. In addition, the PI control unit 150 may further include a divider 158-1, a first adder 158-3, and a second adder 158-5.

The divider 158-1 may perform a division operation on a power reference value P* input from an upper controller (not shown) and the DC link voltage $\hat{V}_{dc}$ input a front end of the inverter 110 to output a DC current reference value $I_{dc}$*.

The first adder 158-3 may summate a negative value of the DC input current value $\hat{I}_{dc}$ estimated as the DC link current and the DC current reference value $I_{dc}$* output from the divider 158-1.

The first PI controller 152 may perform first PI control on a sum value input from the first adder 158-1 to output a field current reference value $I_F$*.

The current converter 156 may convert a voltage value $\hat{V}_{RF}$, applied across both ends of a field shunt resistor $R_F$ designed in the field circuit of the motor 10, into a DC field current value $\hat{I}_F$ according to a predesigned ADC gain $K_F$.

The second adder 158-5 may summate a negative value of the DC field current value $\hat{I}_F$ input from the current converter 156 and the field current reference value $I_F$* input from the first PI controller 152.

The second PI controller 154 may perform second PI control on a sum value "$I_F$*–$\hat{I}_F$" input from the second adder 158-5 to output a voltage value $V_F$ for controlling the field current of the motor 10.

As described above, the voltage value $V_F$ output from the PI controller 150 may be applied to the field circuit of the motor 10 and may be used as a value which controls the generated power (or the generated current) by controlling the field current of the motor 10.

Figure 3:
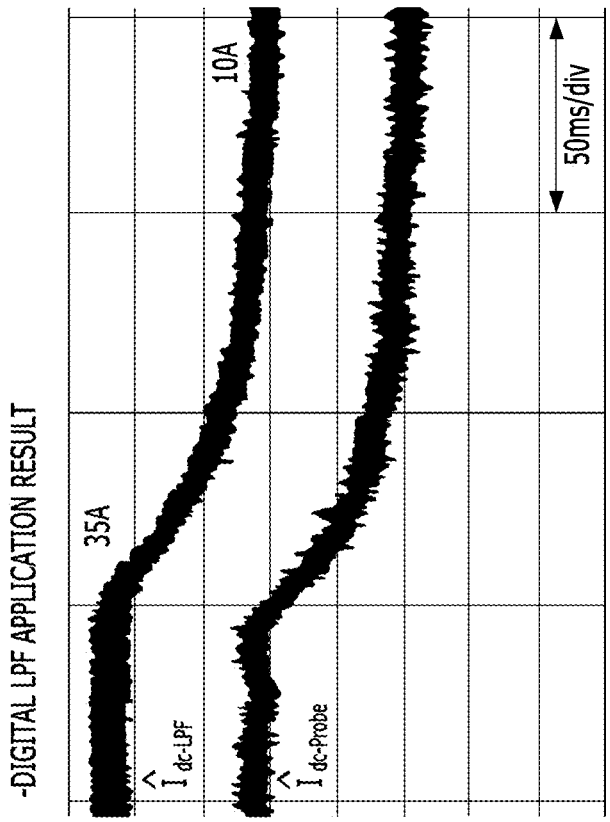
FIG. 3 is a waveform diagram showing a result obtained by comparing a DC link current estimated according to an embodiment of the present invention with a DC link current measured by a current probe.
Figure 3:
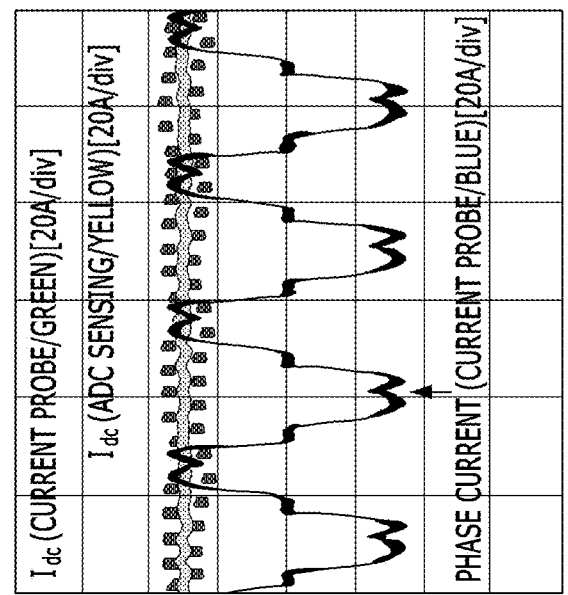

FIG. 3 is a waveform diagram showing a result obtained by comparing a DC link current estimated according to an embodiment of the present invention with a DC link current measured by a current probe.

Referring to a left waveform diagram of FIG. 3, it can be seen that a DC link current measured by the current probe is almost equal to a DC link current estimated according to an embodiment of the present invention.

Referring to a right waveform diagram of FIG. 3, it can be seen that a result $\hat{I}_{dc\text{-}LPF}$ obtained by applying a low pass filter to the DC link current estimated according to an embodiment of the present invention and a DC link current $\hat{I}_{dc\text{-}Probe}$ measured by the current probe have a small offset difference therebetween, but form the same profile.

As a result, it can be seen that in an embodiment of the present invention, the DC link current is accurately estimated even without using the DC link current sensor.

Figure 4:
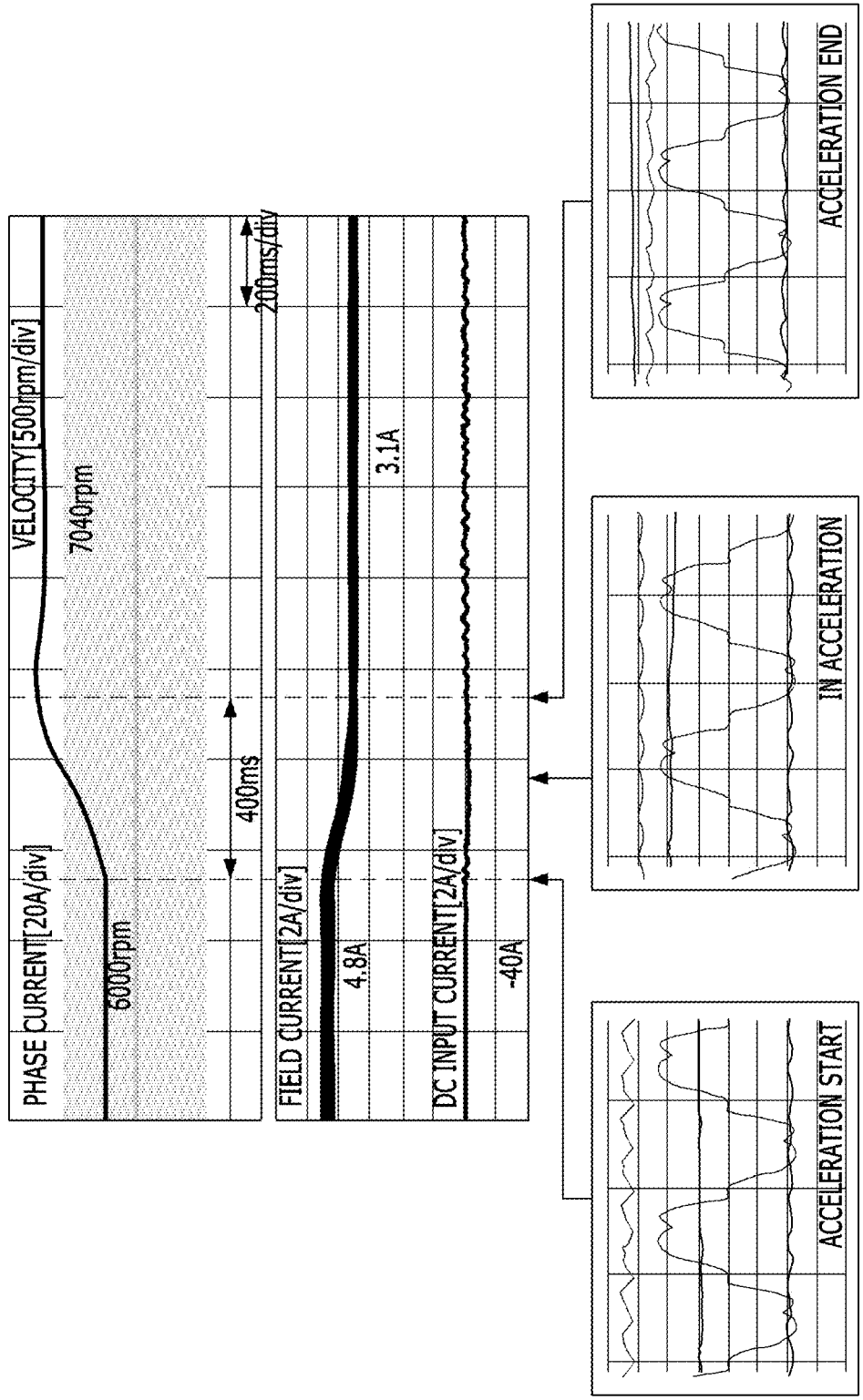
FIG. 4 is a waveform showing the control of a generated power by using a DC link current estimated according to an embodiment of the present invention.

FIG. 4 is a waveform showing the control of a generated power by using a DC link current estimated according to an embodiment of the present invention.

As shown in FIG. 4, it can be seen that a constant DC link current is controlled under a condition where a velocity of a motor is rapidly accelerated from 6000 rpm to 7040 rpm within 400 ms.

Figure 5:
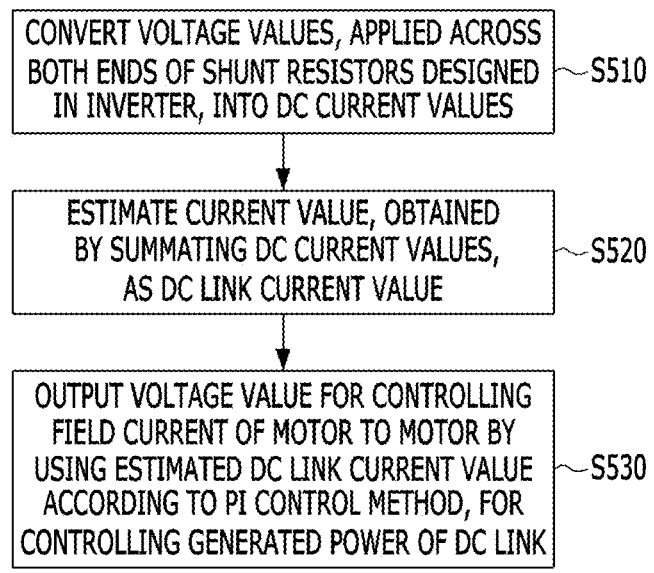
FIG. 5 is a flowchart illustrating a motor control method according to an embodiment of the present invention.

FIG. 5 is a flowchart illustrating a motor control method according to an embodiment of the present invention.

Referring to FIG. 5, first, in step S510, an operation of converting a voltage value, applied across both ends of a shunt resistor designed in an inverter for controlling driving of a motor, into a DC current value according to a predesigned ADC gain may be performed. Here, the shunt resistor designed in the inverter may be included in each of a plurality of switch groups which are connected to one another in parallel in the inverter, and each of the plurality of switch groups may include an upper switch, a lower switch, and the shunt resistor. The upper switch, the lower switch, and the shunt resistor may be serially connected to each other.

Subsequently, in step S520, an operation of estimating a result value, obtained by summating the DC current values, as a DC link current value may be performed.

Subsequently, in step S530, an operation of outputting a voltage value for controlling a field current of the motor to the motor according to the PI control method, based on the estimated DC link current value, may be performed. In this case, a DC link voltage value applied across both ends of a DC link may be needed for calculating the voltage value output to the motor. That is, in step S530, the voltage value for controlling the field current of the motor may be output by using the estimated DC link current value, the DC link voltage value, and a voltage value applied across both ends of a field shunt resistor designed in a field circuit of the motor, based on the PI control method.

For example, step S530 may include an operation of performing a division operation on a power reference value input from an upper controller and the DC link voltage to output a DC current reference value, an operation of summating a negative value of the estimated DC link current value and the DC current reference value output from the divider, an operation of performing first PI control on the DC current reference value input from the first adder to output a field current reference value, an operation of converting a voltage value applied across both ends of a shunt resistor into a DC field current value according to a predesigned ADC gain, an operation of summating a negative value of the DC field current value input from the current converter 156 and the field current reference value input from the first PI controller, and an operation of performing second PI control on a sum value input from the second adder to output a voltage value for controlling the field current of the motor to the motor.

An operation of filtering the estimated DC link current value according to the low pass filtering method may be added between step S520 and step S530.

As described above, according to the embodiments of the present invention, since a DC link current is estimated based on a measurement value measured from a shunt resistor designed in an inverter, the design of the DC link current sensor included in the related art motor control system is omitted, and thus, the total system cost is reduced.

Moreover, according to the embodiments of the present invention, a generated power (or a generated current) of a DC link may be controlled by adjusting a field current of a motor by using the DC link current estimated based on the measurement value measured from the shunt resistor, and thus, the design of the DC link current sensor is not needed for controlling the generated power.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motor control system comprising:
    an inverter connected to a direct current (DC) link including both ends which a DC link voltage value is applied across, the inverter including a plurality of switch groups connected to one another in parallel and applying a three-phase current to a motor according to a switching operation, based on pulse width modulation (PWM) control, of each of the plurality of switch groups;
    a current converter respectively converting voltage values, respectively applied across both ends of shunt resistors respectively included in the plurality of switch groups, into DC current values according to an analog-digital converter (ADC) gain;
    an adder estimating a current value, obtained by summating the DC current values, as a DC link current value; and
    a proportional integral (PI) control unit outputting a voltage value for controlling a field current of the motor to the motor by using the estimated DC link current value according to a PI control method, for controlling a generated power of the DC link,
    wherein the PI control unit outputs the voltage value for controlling the field current of the motor by using the estimated DC link current value, the DC link voltage value, and a voltage value applied across both ends of a field shunt resistor designed in a field circuit of the motor, based on the PI control method,
    wherein the PI control unit comprises
    a divider performing a division operation on a power reference value input from an upper controller and the DC link voltage to output a DC current reference value;

a first adder summating a negative value of the estimated DC link current value and the DC current reference value output from the divider;

a first PI controller performing first PI control on the DC current reference value input from the first adder to output a field current reference value;

a current converter converting a voltage value applied across both ends of a shunt resistor into a DC field current value according to the ADC gain;

a second adder summating a negative value of the DC field current value input from the current converter and the field current reference value input from the first PI controller; and a second PI controller performing second PI control on a sum value input from the second adder to output a voltage value for controlling the field current of the motor to the motor.

2. The motor control system of claim 1, wherein the plurality of switch groups each comprise an upper switch, a lower switch, and a shunt resistor which are serially connected to each other.

3. The motor control system of claim 1, further comprising: a filter filtering the estimated DC link current value according to a low pass filtering method, the filter being provided between the adder and the PI controller.

4. The motor control system of claim 1, wherein the motor is an integrated starter and generator (ISG) motor or a field winding motor.

5. A motor control method comprising:
respectively converting voltage values, respectively applied across both ends of shunt resistors designed in an inverter for controlling driving a motor, into direct current (DC) current values according to an analog-digital converter (ADC) gain;

estimating a current value, obtained by summating the DC current values, as a DC link current value; and outputting a voltage value for controlling a field current of the motor to the motor by using the estimated DC link current value according to a proportional integral (PI) control method, for controlling a generated power of a DC link, wherein the outputting comprises outputting the voltage value for controlling the field current of the motor by using the estimated DC link current value, the DC link voltage value, and a voltage value applied across both ends of the shunt resistor, based on the PI control method, wherein the outputting comprises, performing a division operation on a power reference value input from an upper controller and the DC link voltage to output a DC current reference value;

summating a negative value of the estimated DC link current value and the DC current reference value output from the divider;

performing first PI control on the DC current reference value input from the first adder to output a field current reference value;

converting a voltage value applied across both ends of a shunt resistor into a DC field current value according to the ADC gain;

summating a negative value of the DC field current value input from the current converter and the field current reference value input from the first PI controller; and performing second PI control on a sum value input from the second adder to output a voltage value for controlling the field current of the motor to the motor.

6. The motor control method of claim 5, wherein the shunt resistor designed in the inverter is designed in each of a plurality of switch groups connected to one another in parallel in the inverter, and the plurality of switch groups each comprise an upper switch, a lower switch, and a shunt resistor which are serially connected to each other.

7. The motor control method of claim 5, further comprising: filtering the estimated DC link current value according to a low pass filtering method, the filtering being performed between the estimating and the outputting.

* * * * *